(12) United States Patent
Stefina

(10) Patent No.: US 7,073,407 B2
(45) Date of Patent: Jul. 11, 2006

(54) INTEGRATED CONTROL MODULE FOR USE IN A DUAL CLUTCH TRANSMISSION HAVING INTEGRATED SHIFT ACTUATOR POSITION SENSORS

(75) Inventor: Brian K. Stefina, Waterford, MI (US)

(73) Assignee: BorgWarner Inc., Auburn Hills, MI (US)

( * ) Notice: Subject to any disclaimer, the term of this patent is extended or adjusted under 35 U.S.C. 154(b) by 158 days.

(21) Appl. No.: 10/887,993

(22) Filed: Jul. 9, 2004

(65) Prior Publication Data

US 2006/0009326 A1    Jan. 12, 2006

(51) Int. Cl.
F16H 3/08 (2006.01)
F16H 57/02 (2006.01)

(52) U.S. Cl. ...................... 74/331; 74/606 R
(58) Field of Classification Search .............. 74/331, 74/606 R
See application file for complete search history.

(56) References Cited

U.S. PATENT DOCUMENTS

| | | | | |
|---|---|---|---|---|
| 2,943,502 A * | 7/1960 | Perkins et al. | ................. | 74/339 |
| 3,589,483 A | 6/1971 | Smith | ................... | 192/3.52 |
| 4,445,393 A * | 5/1984 | Braun | ................... | 74/346 |
| 4,461,188 A | 7/1984 | Fisher | ................... | 74/330 |
| 4,513,631 A | 4/1985 | Koivunen | ............... | 74/360 |
| 4,544,057 A | 10/1985 | Webster et al. | .......... | 192/0.076 |
| 4,722,237 A * | 2/1988 | McNinch, Jr. | ............... | 74/346 |
| 4,827,784 A | 5/1989 | Muller et al. | ................ | 74/330 |
| 5,662,198 A | 9/1997 | Kojima et al. | ............. | 192/87.11 |
| 5,711,409 A | 1/1998 | Murata | .................. | 192/87.11 |
| 5,720,203 A | 2/1998 | Honda et al. | .................. | 74/325 |
| 5,890,392 A | 4/1999 | Ludanek et al. | ............... | 74/331 |
| 5,915,512 A | 6/1999 | Adamis et al. | ............ | 192/3.61 |
| 5,950,781 A | 9/1999 | Adamis et al. | ............... | 192/3.6 |
| 5,966,989 A | 10/1999 | Reed, Jr. et al. | .............. | 74/331 |
| 5,979,257 A | 11/1999 | Lawrie | ................... | 74/335 |
| 6,006,620 A | 12/1999 | Lawrie et al. | ................ | 74/335 |
| 6,012,561 A | 1/2000 | Reed, Jr. et al. | ........... | 192/48.2 |
| 6,044,719 A | 4/2000 | Reed, Jr. et al. | .............. | 74/330 |
| 6,145,398 A | 11/2000 | Bansbach et al. | ............. | 74/335 |
| 6,286,381 B1 | 9/2001 | Reed, Jr. et al. | .............. | 74/336 |
| 6,364,809 B1 | 4/2002 | Cherry | ................... | 477/86 |
| 6,953,417 B1 * | 10/2005 | Koenig | ................... | 477/181 |
| 2006/0005647 A1 * | 1/2006 | Braford et al. | ............... | 74/335 |

* cited by examiner

FOREIGN PATENT DOCUMENTS

GB           2 036 203 A      11/1980

*Primary Examiner*—Dirk Wright
(74) *Attorney, Agent, or Firm*—Greg Dziegielewski; Bliss McGlynn, P.C.

(57) ABSTRACT

An integrated control module for a dual clutch transmission having an integrated shift actuator position sensor assembly that includes a valve body having a plurality of raised portions juxtaposed to each other with a plurality of shift actuator bores piston bores formed therein. A plurality of shift actuators are adapted to operatively move the synchronizers of said transmission to affect gear changes, and include a plurality of shift actuator pistons slidingly disposed within the shift actuator bores. A hydraulic control assembly is adapted to control the operative hydraulic functions of the transmission. A transmission control assembly in electrical communication with the hydraulic control assembly and with a higher level vehicle control system provides the requisite signals to control the hydraulic control assembly. A sensor assembly is also included that has a plurality of detecting elements fixedly mounted to the raised portions of the valve body and a plurality of reference elements fixedly mounted to each of the plurality of actuator pistons such that the detecting elements can sense the movement of the actuator pistons within the actuator piston bores to determine the positions of the transmission synchronizers.

20 Claims, 7 Drawing Sheets

INTEGRATED CONTROL MODULE FOR USE IN A DUAL CLUTCH TRANSMISSION HAVING INTEGRATED SHIFT ACTUATOR POSITION SENSORS

BACKGROUND OF THE INVENTION

1. Field of the Invention

The present invention relates, generally to an integrated control module for a dual clutch transmission and, more specifically, to an integrated control module used to control the operation of a dual clutch transmission as used in a motor vehicle having integrated shift actuator position sensors.

2. Description of the Related Art

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle. Presently, there are two typical transmissions widely available for use in conventional motor vehicles. The first and oldest type is the manually operated transmission. These transmissions include a foot-operated start-up or launch clutch that engages and disengages the driveline with the power plant and a gearshift lever to selectively change the gear ratios within the transmission. When driving a vehicle having a manual transmission, the driver must coordinate the operation of the clutch pedal, the gearshift lever, and the accelerator pedal to achieve a smooth and efficient shift from one gear to the next. The structure of a manual transmission is simple and robust and provides good fuel economy by having a direct power connection from the engine to the final drive wheels of the vehicle. Additionally, since the operator is given complete control over the timing of the shifts, the operator is able to dynamically adjust the shifting process so that the vehicle can be driven most efficiently. One disadvantage of the manual transmission is that there is an interruption in the drive connection during gear shifting. This results in losses in efficiency. In addition, there is a great deal of physical interaction required on the part of the operator to shift gears in a vehicle that employs a manual transmission.

The second and newer choice for the transmission of power in a conventional motor vehicle is an automatic transmission. Automatic transmissions offer ease of operation. The driver of a vehicle having an automatic transmission is not required to use both hands, one for the steering wheel and one for the gearshift, and both feet, one for the clutch and one for the accelerator and brake pedal in order to safely operate the vehicle. In addition, an automatic transmission provides greater convenience in stop and go situations, because the driver is not concerned about continuously shifting gears to adjust to the ever-changing speed of traffic. Although conventional automatic transmissions avoid an interruption in the drive connection during gear shifting, they suffer from the disadvantage of reduced efficiency because of the need for hydrokinetic devices, such as torque converters, interposed between the output of the engine and the input of the transmission for transferring kinetic energy therebetween. In addition, automatic transmissions are typically more mechanically complex and therefore more expensive than manual transmissions.

For example, torque converters typically include impeller assemblies that are operatively connected for rotation with the torque input from an internal combustion engine, a turbine assembly that is fluidly connected in driven relationship with the impeller assembly and a stator or reactor assembly. These assemblies together form a substantially toroidal flow passage for kinetic fluid in the torque converter. Each assembly includes a plurality of blades or vanes that act to convert mechanical energy to hydrokinetic energy and back to mechanical energy. The stator assembly of a conventional torque converter is locked against rotation in one direction but is free to spin about an axis in the direction of rotation of the impeller assembly and turbine assembly. When the stator assembly is locked against rotation, the torque is multiplied by the torque converter. During torque multiplication, the output torque is greater than the input torque for the torque converter. However, when there is no torque multiplication, the torque converter becomes a fluid coupling. Fluid couplings have inherent slip. Torque converter slip exists when the speed ratio is less than 1.0 (RPM input>than RPM output of the torque converter). The inherent slip reduces the efficiency of the torque converter.

While torque converters provide a smooth coupling between the engine and the transmission, the slippage of the torque converter results in a parasitic loss, thereby decreasing the efficiency of the entire powertrain. Further, the torque converter itself requires pressurized hydraulic fluid in addition to any pressurized fluid requirements for the actuation of the gear shifting operations. This means that an automatic transmission must have a large capacity pump to provide the necessary hydraulic pressure for both converter engagement and shift changes. The power required to drive the pump and pressurize the fluid introduces additional parasitic losses of efficiency in the automatic transmission.

In an ongoing attempt to provide a vehicle transmission that has the advantages of both types of transmissions with fewer of the drawbacks, combinations of the traditional "manual" and "automatic" transmissions have evolved. Most recently, "automated" variants of conventional manual transmissions have been developed which shift automatically without any input from the vehicle operator. Such automated manual transmissions typically include a plurality of power-operated actuators that are controlled by a transmission controller or some type of electronic control unit (ECU) to automatically shift synchronized clutches that control the engagement of meshed gear wheels traditionally found in manual transmissions. The design variants have included either electrically or hydraulically powered actuators to affect the gear changes. However, even with the inherent improvements of these newer automated transmissions, they still have the disadvantage of a power interruption in the drive connection between the input shaft and the output shaft during sequential gear shifting. Power interrupted shifting results in a harsh shift feel that is generally considered to be unacceptable when compared to smooth shift feel associated with most conventional automatic transmissions.

To overcome this problem, other automated manual type transmissions have been developed that can be power-shifted to permit gearshifts to be made under load. Examples of such power-shifted automated manual transmissions are shown in U.S. Pat. No. 5,711,409 issued on Jan. 27, 1998 to Murata for a Twin-Clutch Type Transmission, and U.S. Pat. No. 5,966,989 issued on Apr. 4, 2000 to Reed, Jr. et al for an Electro-mechanical Automatic Transmission having Dual Input Shafts. These particular types of automated manual transmissions have two clutches and are generally referred to simply as dual, or twin, clutch transmissions. The dual clutch structure is most often coaxially and cooperatively configured to derive power input from a single engine flywheel arrangement. However, some designs have a dual clutch assembly that is coaxial, but with the clutches located on opposite sides of the transmissions body and having different input sources. Regardless, the layout is the equivalent of having two transmissions in one housing, namely one power transmission assembly on each of two input shafts concomitantly driving one output shaft. Each transmission can be shifted and clutched independently. In this manner, uninterrupted power upshifting and downshifting between gears, along with the high mechanical efficiency of a manual transmission is available in an automatic transmission form. Thus, significant increases in fuel economy and vehicle performance may be achieved through the effective use of certain automated manual transmissions.

The dual clutch transmission structure may include two dry disc clutches each with their own clutch actuator to control the engagement and disengagement of the two-clutch discs independently. While the clutch actuators may be of the electro-mechanical type, since a lubrication system within the transmission requires a pump, some dual clutch transmissions utilize hydraulic shifting and clutch control. These pumps are most often gerotor types, and are much smaller than those used in conventional automatic transmissions because they typically do not have to supply a torque converter. Thus, any parasitic losses are kept small. Shifts are accomplished by engaging the desired gear prior to a shift event and subsequently engaging the corresponding clutch. With two clutches and two inputs shafts, at certain times, the dual clutch transmission may be in two different gear ratios at once, but only one clutch will be engaged and transmitting power at any given moment. To shift to the next higher gear, first the desired gears on the input shaft of the non-driven clutch assembly are engaged, then the driven clutch is released and the non-driven clutch is engaged.

This requires that the dual clutch transmission be configured to have the forward gear ratios alternatingly arranged on their respective input shafts. In other words, to perform up-shifts from first to second gear, the first and second gears must be on different input shafts. Therefore, the odd gears will be associated with one input shaft and the even gears will be associated with the other input shaft. In view of this convention, the input shafts are generally referred to as the odd and even shafts. Typically, the input shafts transfer the applied torque to a single counter shaft, which includes mating gears to the input shaft gears. The mating gears of the counter shaft are in constant mesh with the gears on the input shafts. The counter shaft also includes an output gear that is meshingly engaged to a gear on the output shaft. Thus, the input torque from the engine is transferred from one of the clutches to an input shaft, through a gear set to the counter shaft and from the counter shaft to the output shaft.

Gear engagement in a dual clutch transmission is similar to that in a conventional manual transmission. One of the gears in each of the gear sets is disposed on its respective shaft in such a manner so that it can freewheel about the shaft. A synchronizer is also disposed on the shaft next to the freewheeling gear so that the synchronizer can selectively engage the gear to the shaft. To automate the transmission, the mechanical selection of each of the gear sets is typically performed by some type of actuator that moves the synchronizers. A reverse gear set includes a gear on one of the input shafts, a gear on the counter shaft, and an intermediate gear mounted on a separate counter shaft meshingly disposed between the two so that reverse movement of the output shaft may be achieved.

While these power-shift dual clutch transmissions overcome several drawbacks associated with conventional transmissions and the newer automated manual transmissions, it has been found that controlling and regulating the automatically actuated dual clutch transmissions is a complicated matter and that the desired vehicle occupant comfort goals are difficult to achieve. There are a large number of events to properly time and execute within the transmission to achieve smooth and efficient operation, not only during the power-shifting events but also throughout the entire operating range of the transmission as well. To this point, the control of the various components within the dual clutch transmissions has been generally adequate, but still leaves room for improvement. More specifically, the current approaches to providing the physical control of the functions of the dual clutch transmissions remain similar to automatic manual transmissions, which employ a large number of separate components both inside and outside of the transmission case. The use of separate components to provide control over the shift actuation, clutch engagements, and cooling fluid flow of the dual clutch transmission is costly and inefficient. There are particular manufacturing and assembly costs inherently involved with using the separate components. First, each of the separate components must be individually assembled throughout portions of the transmission. Second, the separate components necessitate the use of the separate hydraulic lines and electrical connections throughout the transmission to provide the proper communication between the components. Therefore, there exists a need in the related art for a single integrated module that integrates all the previously separate components that are used to control the functions and operation of a dual clutch transmission.

Furthermore, to sense and monitor the control functions of the dual clutch transmission, separate sensors are typically placed throughout the transmission to detect the movement of the various active components inside the transmission case. Conventional approaches regarding the placement and types of these separate sensors require that they be placed in very close proximity to the rotating shafts and in between the moving gear sets. This makes them subject to the vibration, high temperatures, and flowing hydraulic fluid of the immediate environment. This is particularly true of the sensors used to sense and monitor gear engagement, disengagement, and non-commanded drift of the synchronizers that engage the gear sets. Also, sensors that are robust enough to withstand this environment and provide a reasonable lifespan while producing accurate readings in this environment are generally more costly. Thus, a more cost effective and efficient means of sensing and monitoring the gear movements of the dual clutch transmission is needed. More specifically, there remains a need in the art for a single device that is removed from the extreme environment of a close proximate location to the input shafts and gear sets. Therefore, there exists a need in the related art for an integrated sensor device that integrates the previously separate sensor components that are used to sense and monitor the control functions of the dual clutch transmission and that locates the sensing means at a distance from the transmission shafts and gears.

Accordingly, there remains a need in the related art not only for a single integrated module integrates all the previously separate components that are used to control the functions and operation of a dual clutch transmission, but also for an integrated module that includes an integrated sensor device for sensing and monitoring the actions of the dual clutch transmission.

SUMMARY OF THE INVENTION

The disadvantages of the related art are overcome by an integrated control module for a dual clutch transmission having an integrated shift actuator position sensor assembly that includes a valve body having an inlet in fluid communication with a source of pressurized hydraulic fluid, a plurality of outlets, and a plurality of internal hydraulic passages disposed therebetween. The valve body further includes a plurality of raised portions juxtaposed to each other with a plurality of shift actuator bores piston bores formed therein. A plurality of shift actuators are adapted to operatively move the synchronizers of said transmission to affect gear changes, and include a plurality of shift actuator pistons slidingly disposed within the shift actuator bores. A hydraulic control assembly is mounted to the valve body and is adapted to operatively control the pressurized hydraulic fluid from the inlet through the plurality of internal hydraulic passages to the plurality of outlets to control the operative hydraulic functions of the transmission. A transmission control assembly is mounted to the valve body in electrical communication with the hydraulic control assembly and with a higher level vehicle control system. The transmission control assembly is adapted to be operatively responsive to the higher level control system to provide the requisite signals to control the hydraulic control assembly. A sensor assembly is also included that has a plurality of detecting elements fixedly mounted to the raised portions of the valve body and a plurality of reference elements fixedly mounted to each of the plurality of actuator pistons such that the detecting elements can sense the movement of the actuator pistons within the actuator piston bores to determine the positions of the transmission synchronizers.

In this manner, the inefficiencies and performance losses of the prior art systems through the use of separate and spaced hydraulic and electrical control and support components, and their requisite piping and electrical connections are overcome by the present invention. Furthermore, the costs related to the assembly of individual and separate components is greatly reduced by the integrated control module. The wiring harnesses for the integrated control module are also simplified and cost less to produce than those of prior art systems. Additionally, the integration of a combined and centralized sensor assembly provides greater cost effectiveness and efficiency in manufacturing and assembly of the integrated control module, so that the overall assembly of the dual clutch transmission becomes more efficient and cost effective with a greatly reduced assembly time.

Other objects, features, and advantages of the present invention will be readily appreciated, as the same becomes better understood after reading the subsequent description taken in connection with the accompanying drawings.

DETAILED DESCRIPTION OF THE PREFERRED EMBODIMENT(S)

Figure 1:
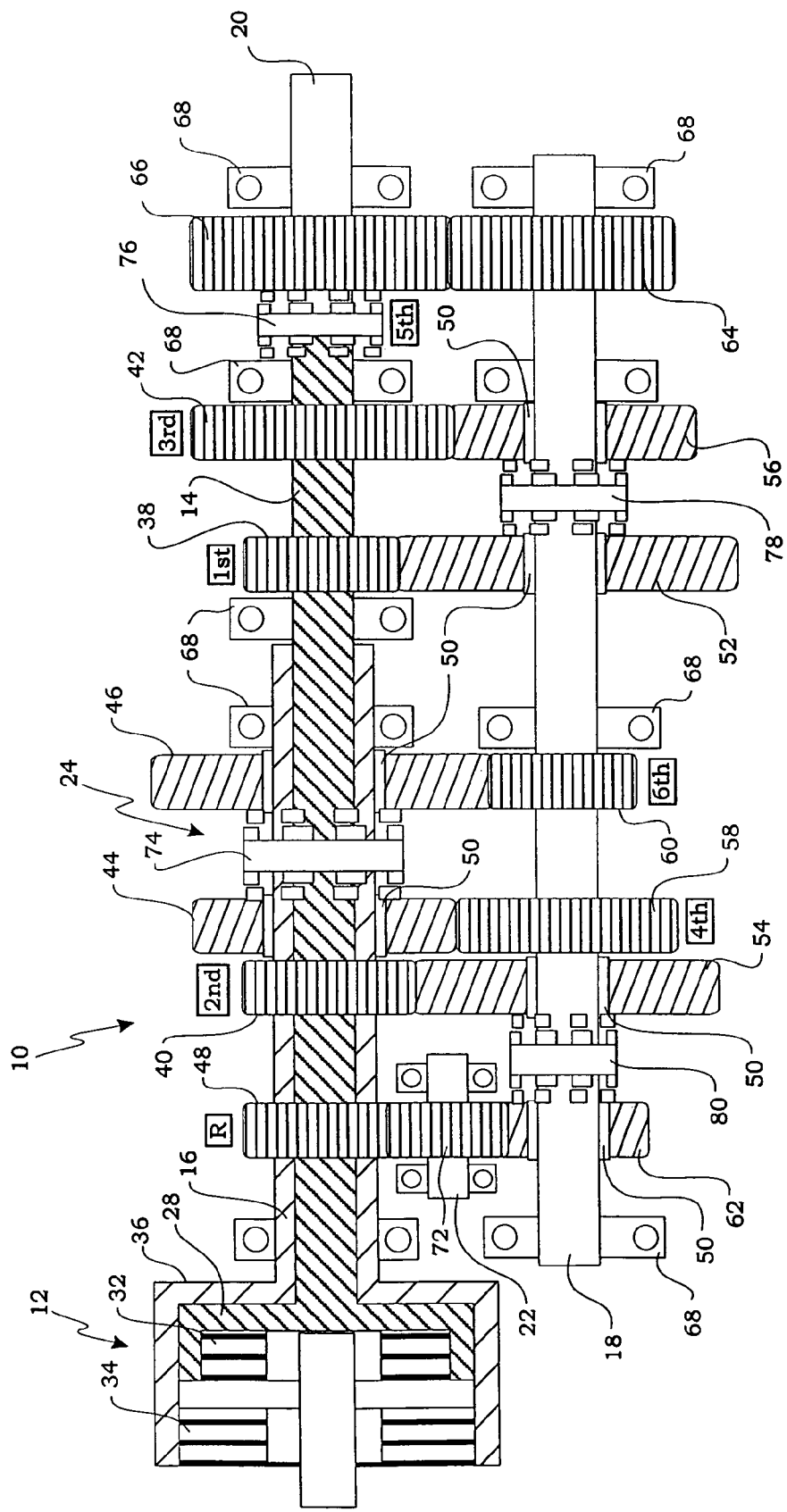
FIG. 1 is a generalized schematic illustration of a dual clutch transmission that may be employed with the present invention.

A representative dual clutch transmission that may be controlled by the present invention is generally indicated at 10 in the schematic illustrated in FIG. 1. Specifically, as shown in FIG. 1, the dual clutch transmission 10 includes a dual, coaxial clutch assembly generally indicated at 12, a first input shaft, generally indicated at 14, a second input shaft, generally indicated at 16, that is coaxial to the first, a counter shaft, generally indicated at 18, an output shaft 20, a reverse counter shaft 22, a plurality of synchronizers, generally indicated at 24.

The dual clutch transmission 10 forms a portion of a vehicle powertrain and is responsible for taking a torque input from a prime mover, such as an internal combustion engine, and transmitting the torque through selectable gear ratios to the vehicle drive wheels. The dual clutch transmission 10 operatively routes the applied torque from the engine through the dual, coaxial clutch assembly 12 to either the first input shaft 14 or the second input shaft 16. The input shafts 14 and 16 include a first series of gears, which are in constant mesh with a second series of gears disposed on the counter shaft 18. Each one of the first series of gears interacts with one of the second series of gears to provide the different gear ratios sets used for transferring torque. The counter shaft 18 also includes a first output gear that is in constant mesh with a second output gear disposed on the output shaft 20. The plurality of synchronizers 24 are disposed on the two input shafts 14, 16 and on the counter shaft 18 and are operatively controlled by a plurality of shift actuators 26 (discussed in reference to FIG. 2 below) to selectively engage the gear ratio sets. Thus, torque is transferred from the engine to the dual, coaxial clutch assembly 12, to one of the input shafts 14 or 16, to the counter shaft 18 through one of the gear ratio sets, and to the output shaft 20. The output shaft 20 further provides the output torque to the remainder of the powertrain. Additionally, the reverse counter shaft 22 includes an intermediate gear that is disposed between one of the first series of gears and one of the second series of gears, which allows for a reverse rotation of the counter shaft 18 and the output shaft 20. Each of these components will be discussed in greater detail below.

Specifically, the dual, coaxial clutch assembly 12 includes a first clutch mechanism 32 and a second clutch mechanism 34. The first clutch mechanism 32 is, in part, physically connected to a portion of the engine flywheel (not shown) and is, in part, physically attached to the first input shaft 14, such that the first clutch mechanism 32 can operatively and selectively engage or disengage the first input shaft 14 to and from the flywheel. Similarly, the second clutch mechanism 34 is, in part, physically connected to a portion of the flywheel and is, in part, physically attached to the second input shaft 16, such that the second clutch mechanism 34 can operatively and selectively engage or disengage the second input shaft 16 to and from the flywheel. As can be seen from FIG. 1, the first and second clutch mechanisms 32, 34 are coaxial and co-centric such that the outer case 28 of the first clutch mechanism 32 fits inside of the outer case 36 of the second clutch mechanism 34. Similarly, the first and second input shafts 14, 16 are also coaxial and co-centric such that the second input shaft 16 is hollow having an inside diameter sufficient to allow the first input shaft 14 to pass through and be partially supported by the second input shaft 16. It should be appreciated that, although not illustrated herein, the first and second clutch mechanisms 32, 34 and the first and second input shafts 14, 16 may be physically arranged within the transmission in a parallel, rather than co-centric structure.

The first input shaft 14 includes a first input gear 38 and a third input gear 42. The first input shaft 14 is longer in length than the second input shaft 16 so that the first input gear 38 and a third input gear 42 are disposed on the portion of the first input shaft 14 that extends beyond the second input shaft 16. The second input shaft 16 includes a second input gear 40, a fourth input gear 44, a sixth input gear 46, and a reverse input gear 48. As shown in FIG. 1, the second input gear 40 and the reverse input gear 48 are fixedly supported on the second input shaft 16 and the fourth input gear 44 and sixth input gear 46 are rotatably supported about the second input shaft 16 upon bearing assemblies 50 so that their rotation is unrestrained unless the accompanying synchronizer is engaged, as will be discussed in greater detail below.

The counter shaft 18 is a single, one-piece shaft that includes the opposing, or counter, gears to those on the inputs shafts 14, 16. As shown in FIG. 1, the counter shaft 18 includes a first counter gear 52, a second counter gear 54, a third counter gear 56, a fourth counter gear 58, a sixth counter gear 60, and a reverse counter gear 62. The counter shaft 18 fixedly retains the fourth counter gear 58 and sixth counter gear 60, while first, second, third, and reverse counter gears 52, 54, 56, 62 are supported about the counter shaft 18 by bearing assemblies 50 so that their rotation is unrestrained unless the accompanying synchronizer is engaged as will be discussed in greater detail below. The counter shaft 18 also fixedly retains a first drive gear 64 that meshingly engages the corresponding second driven gear 66 on the output shaft 20. The second driven gear 66 is fixedly mounted on the output shaft 20. The output shaft 20 extends outward from the transmission 10 to provide an attachment for the remainder of the powertrain.

The reverse counter shaft 22 is a relatively short shaft having a single reverse intermediate gear 72 that is disposed between, and meshingly engaged with, the reverse input gear 48 on the second input shaft 16 and the reverse counter gear 62 on the counter shaft 18. Thus, when the reverse gears 48, 62, and 72 are engaged, the reverse intermediate gear 72 on the reverse counter shaft 22 causes the counter shaft 18 to turn in the opposite rotational direction from the forward gears thereby providing a reverse rotation of the output shaft 20. It should be appreciated that all of the shafts of the dual clutch transmission 10 are disposed and rotationally secured within the transmission 10 by some manner of bearing assembly such as roller bearings, for example, shown at 68 in FIG. 1.

The engagement and disengagement of the various forward and reverse gears is accomplished by the actuation of the synchronizers 24 within the transmission. As shown in FIG. 1 in this example of a dual clutch transmission 10, there are four synchronizers 74, 76, 78, and 80 that are utilized to shift through the six forward gears and reverse. It should be appreciated that there are a variety of known types of synchronizers that are capable of engaging a gear to a shaft and that the particular type employed for the purposes of this discussion is beyond the scope of the present invention. Generally speaking, any type of synchronizer that is movable by a shift fork or like device may be employed. As shown in the representative example of FIG. 1, the synchronizers are two sided, dual actuated synchronizers, such that they engage one gear to its respective shaft when moved off of a center neutralized position to the right and engage another gear to its respective shaft when moved to the left. Specifically with reference to the example illustrated in FIG. 1, synchronizer 78 can be actuated to the left to engage the first counter gear 52 on the counter shaft 18 or actuated to the right to engage the third counter gear 56. Synchronizer 80 can be actuated to the left to engage the reverse counter gear 62 or actuated to the right to engage the second counter gear 54. Likewise, synchronizer 74 can be actuated to the left to engage the fourth input gear 44 or actuated to the right to engage the sixth input gear 46. Synchronizer 76 is actuated to the right to directly engage the end of the first input shaft 14 to the output shaft 20 thereby providing a direct 1:1 (one to one) drive ratio for fifth gear. There is no gear set to engage to the left of synchronizer 76. It should be appreciated that this example of the dual clutch transmission is representative and that other gear set, synchronizer, and shift actuator arrangements are possible within the dual clutch transmission 10 as long as the even and odd gear sets are disposed on opposite input shafts.

It should be further appreciated that the general operation of the dual clutch transmission 10 may be managed by some type of higher-level control device such as an electronic control unit (ECU) that oversees the functioning of the operation of the vehicle. As will be discussed below, the particular functions of the transmission itself are controlled by a transmission control assembly (88 in FIGS. 4 and 5) that may be responsive to the overall control of the higher-level control device. It should be further appreciated that the transmission may also be designed to take direct inputs from a variety of sources to control the functions of the transmission directly such that a cooperative interaction with other vehicle control devices is employed rather than a management subordination scheme under a higher-level control device The first and second clutch mechanisms 32 and 34 of the dual, coaxial clutch assembly 12 are operatively engaged and disengaged in a coordinated manner relative to the actuator of the various gear sets by the synchronizer 24 to selectively transfer torque to the output shaft 20. By way of example, if torque is being transferred to the drive wheels of the vehicle to initiate movement from a standing start, the lowest, or first, gear ratio of the dual clutch transmission 10 will likely be engaged. Therefore, as seen in FIG. 1, synchronizer 78 will be driven to the left to engage the first counter gear 52 to the counter shaft 18 and the first clutch mechanism 32 will be engaged to transfer torque from the engine to the output shaft 20 through the first gear set. When vehicle speed increases and it is determined that the conditions require a shift to the second gear set, synchronizer 80 will first be driven to the right to engage the second counter gear 54 to the counter shaft 18. Then the second clutch mechanism 34 will be engaged as the first clutch mechanism 32 is disengaged. In this manner, a powershift, where no power interruption occurs, is affected. Additionally, while engaged and driving a particular gear, the first and second clutch mechanisms 32 and 34 are controlled by certain stored routines that provide varying amounts of engagement force to the clutch discs and thereby operatively control the amount of torque transferred across the clutches.

Figure 2:
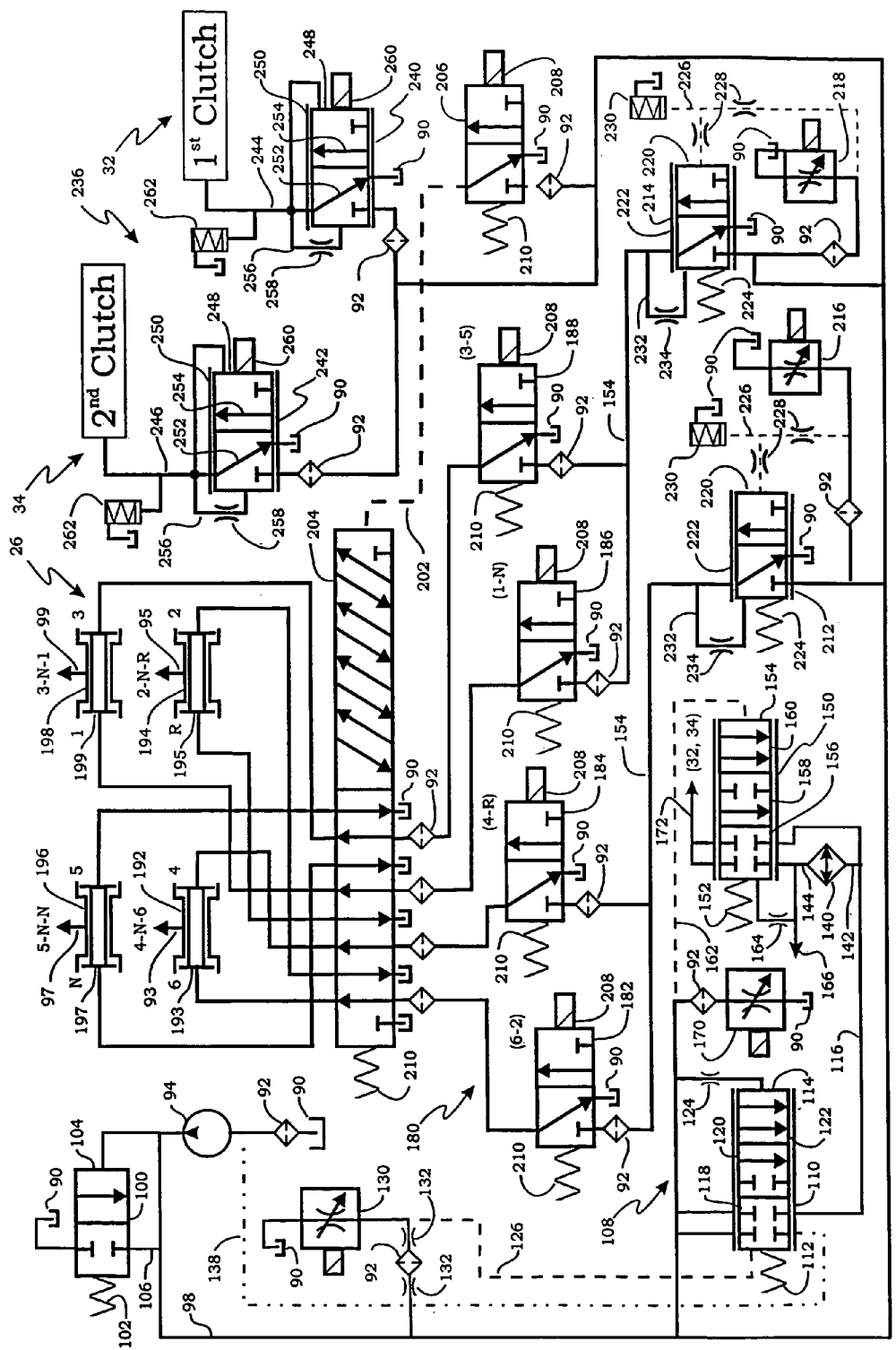
FIG. 2 is a schematic illustration of the electro-hydraulic control circuit that may be employed with a dual clutch transmission of the type illustrated in FIG. 1.

Thus, it can be readily seen that a number of control assemblies or systems must be in place to control the operation of the dual clutch transmission. Furthermore, since the clutch mechanisms, gear sets, and other mechanical portions of the transmission are cooled and lubricated by the hydraulic fluid contained within the transmission, there must be a control assembly or system for these purposes as well. As an example, FIG. 2 schematically illustrates a typical electro-hydraulic circuit, which has the requisite control assemblies and systems that may be employed with the dual clutch transmission 10 described above and with the present invention.

To produce a flow of pressurized hydraulic fluid, which is used as the hydraulic actuation and motive force for the transmission control assemblies and systems, and which is also used as the lubrication and cooling media within the transmission, a transmission pump and associated regulating circuit are required. As shown in FIG. 2, this example of a dual clutch transmission hydraulic circuit is of a wet-sump type, meaning that the bulk of the hydraulic fluid is maintained in and drawn from a pan or sump 90. The sump symbol is used with the various hydraulic circuits illustrated in FIG. 2 to indicate that a return path from the particular portion of the circuit is provided back to the sump 90. A pump 94 is used to provide positive pressure to the cooling fluid as it is drawn from the sump 90 through a filter 92. The filter symbol is also used throughout FIG. 2 to indicate that the particular hydraulic path includes a like filtering device. It should be appreciated that the filter 92 may be one singular filter, or a plurality of individual filters for each path, or some combination of both.

The pump output charges a main pressure line 98 that feeds the various components and hydraulic circuits throughout the transmission 10. This pressure output from the pump 94 is typically referred to as "line" pressure. A pump pressure relief valve 100 is operatively connected in fluid communication with the main pressure line 98 to provide a maximum upper limit for the positive pressure provided by the pump 94. The pressure relief valve 100 is moved to its closed position, as shown in FIG. 2, by a biasing member 102. The biasing member 102 has a pre-determined spring force that corresponds to the desired maximum system pressure. In the advent that the pressure in the main pressure line 98 exceeds the pre-determined maximum, the excessive pressure, as applied to the right side of the valve, will move the valve member 104 of the pressure relief valve 100 to the left, overcoming the spring force of biasing member 102. In this manner, the previously blocked relief passage 106 is opened to the sump 90 allowing the excessive pressure to bleed off and dropping the pressure in the main pressure line 98 until the biasing member 102 can force the valve member 104 of the relief valve 100 back to its closed position. Thus, the pump 94 provides "line" pressure to a maximum value as set by the operation of the relief valve 100.

One of the operative systems that the main pressure line 98 feeds is the clutch cooling fluid control assembly generally indicated at 108. It should be appreciated that the cooling fluid control assembly 108 may be structured in a variety of ways. However, for the purpose of this example, the dual clutch transmission 10 shown herein employs a clutch cooling pressure regulator 110, a line pressure VBS (variable bleed solenoid) 130, a cooling unit 140, a clutch cooling flow regulator 150, and a cooling fluid VBS 170. The clutch cooling pressure regulator 110 maintains the pressure supplied from the main pressure line 98 at a pre-determined operating pressure, or setpoint. The clutch cooling pressure regulator 110 is shown in FIG. 2 in its closed position and includes a biasing member 112 and a main valve member 114. The main valve member 114 has internal flow passages, which are separated into left 118, middle 120, and right 122 portions as illustrated in this figure.

The hydraulic pressure and flow in the main pressure line 98 is supplied to the right side of the valve member 114 through a flow restrictor 124 that reduces the flow volume but maintains the applied pressure. With the pump 94 operating, the pressure delivered to the right side of the valve member 114 overcomes the spring force of the biasing member 112 and moves the valve member 114 to the right from the closed left position 118 to the middle operable position 120. Here, the internal flow passages of the middle operable position 120 allow the flow of cooling fluid from the main pressure line 98 to flow into the regulated line 116. A regulating control line 126, shown as a dotted line, provides a controllable biasing force to the left side of the clutch cooling fluid regulator 110. The regulating control line 126 delivers a portion of the pressure from the main pressure line 98 to the left side of the regulator 110 under the control of the line pressure VBS 130.

The line pressure VBS 130 is electrically operated by the transmission control assembly 88 (FIG. 3) and supplies a varying portion of the available line pressure through the regulating line 126 to the clutch cooling pressure regulator 110 by bleeding off some portion of the line pressure as supplied through flow restrictors 132 and filter 92 to the sump 90. In this manner, the line pressure VBS 130 selectively and operatively sets the desired cooling fluid pressure setpoint for the clutch cooling pressure regulator 110. The line pressure VBS 130 varies the pressure in the regulating line 126 to maintain the cooling fluid output pressure delivered from the clutch cooling pressure regulator 110 about the desired output pressure setpoint while accounting for fluctuations in the output pressure due to downstream pressure changes.

The clutch cooling pressure regulator 110 also provides control over rapid increases, or surges, in the main pressure line 98 that exceeds the immediate correction ability of the line pressure VBS 130. The right valve position 122 of the valve member 114 opens an additional flow passage that not only allows for the continued flow of fluid through the pressure regulator 110 to the regulated line 116, but also allow a portion of the increased flow to pass to the suction line 138. The suction line 138 normally remains closed off by the left and middle valve portions 118, 120 respectively of the valve member 114. However, when a sharp or rapid increase of pressure in the main pressure line 98 drives the valve member 114 all the way to the left, a corrective portion of the flow is fed back to the suction side of the pump 94. As the suction line 138 bleeds off the surge of excessive pressure flow, the regulator valve member 114 moves back to the middle operative valve position 120.

The regulated hydraulic flow from line 116 out of the clutch cooling pressure regulator 110 feeds the cooling unit 140 and the clutch cooling flow regulator 150. The cooling unit 140 may be of any type of fluid cooler designed to dissipate heat and reduce the temperature of the fluid returned to the sump. The cooling unit 140 may include, but is not limited to, a heat exchanger of the fluid-to-air type as is commonly known in the art. It should be appreciated that if the cooling unit 140 is of a fluid-to-air type it will be mounted outside of the transmission case with hydraulic lines 142 and 144 providing the appropriate routing. The clutch cooling pressure regulator 110 and the clutch cooling flow regulator 150 are substantially similar. The clutch cooling flow regulator 150 includes a biasing member 152 and a main valve member 154. The main valve member 154 has internal flow passages, which are separated into left 156, middle 158, and right 160 valve portions (as illustrated).

The regulator control line 162 (shown as a dotted line) provides an actuating force to the right side of the clutch cooling flow regulator 150. The regulator control line 162 delivers a portion of the pressure from the main pressure line 98 under the control of the cooling fluid VBS 170 to the right side of the valve member 154. The cooling fluid VBS 170 is electrically operated by the transmission control assembly 88 (FIG. 3) to control the delivery of cooling fluid to the clutches 32, 34 through the cooing fluid supply line 172 by regulating the cooling fluid flow through the clutch cooling flow regulator 150. The cooling fluid VBS 170 supplies a variable portion of the available line pressure through the regulator control line 162 to the right side of the clutch cooling flow regulator 150 by operatively bleeding off some portion of the line pressure applied to the right side of the valve member 154 to the sump 90. The pressure supplied to the right side of the clutch cooling flow regulator 150 moves the valve member 154 to the left. Under clutch low load or low stress conditions, the cooling fluid VBS 170 causes the clutch cooling flow regulator 150 to provide a regulated supply of pressurized cooling fluid from the cooling unit 140 as the primary cooling source through the middle valve section 158 of valve member 154. Under clutch high stress or heavy load conditions, the cooling fluid VBS 170 causes the clutch cooling flow regulator 150 to provide a regulated supply of cooling fluid from the cooling unit 140 as the primary cooing source and additionally provide cooling fluid directly from the pump 94 through the right valve section 160. The determination of when the cooling fluid VBS 170 causes the clutch cooling flow regulator 150 to provide pressurized cooling fluid from either the middle or right valve section 158, 160 of the valve member 154 is predetermined and under the control of the transmission control assembly.

A biasing pressure taken from the output line 144 of the cooling unit 140 is applied to the left side of the valve member 154 through a restrictor 164 to supplement the biasing force of the biasing member 152. This assists the biasing member 152 in returning the valve member 154 to the closed position when the applied controlling pressure through the regulator control line 162 is removed or drops. It should be noted that line 144 from the cooling unit 140 also provides a portion of the pressurized fluid to other parts of the dual clutch transmission 10 for lubrication or other needs, as indicated by 166. It should be appreciated that other routing arrangements for the cooling unit 140 may also be employed. For example, the input pressure to the cooling unit 140 may be separately regulated from the line pressure, or the input pressure to the clutch cooling flow regulator 150 may be uncontrolled line pressure.

Depending on the physical structure and particular operative design considerations of the dual clutch transmission, the hydraulic circuit employed to control and support it may also include a second clutch cooling fluid regulator and a second control actuator. Generally speaking, only a single cooling fluid supply is provided to a co-centric dual clutch arrangement as discussed with reference to FIG. 1. However, if a dual clutch transmission having a parallel clutch arrangement is employed, two separate clutch cooling flow regulators may be used to separately control the flow of cooling fluid.

With continuing reference to FIG. 2, to control the operation of the synchronizers 24 (FIG. 1) and operatively shift the gear sets in and out of engagement, hydraulic shift actuators generally indicated at 26 are employed to either move the synchronizers left or right into gear engagements or to neutralize (center) the synchronizers 24. The application of hydraulic pressure to the shift actuators 26 is operatively controlled by actuator solenoid valves, generally indicated at 180. In FIG. 2, the shift actuators 26 are illustrated in the neutral position and the actuator solenoid valves 180 are illustrated in the de-energized position. Shift forks are schematically illustrated and generally indicated at 96. Specifically, they are shown as arrows 93, 95, 97, and 99 extending from the shift actuators 26. The shift forks 96 will be discussed in greater detail below. For clarity, the synchronizers 24 are not illustrated in FIG. 2. Each of the shift actuators 26 is a dual hydraulic assembly operatively moving a two-sided synchronizer 24 to engage their respective gear sets.

As shown in FIG. 2 with respect to the example of a dual clutch transmission 10 of FIG. 1, there are four actuator solenoid valves 182, 184, 186, and 188 that control the four shift actuators 192, 194, 196, and 198. As will be discussed below, the shift actuators further include slidable actuator pistons 193, 195, 197, and 199 respectively, which operatively move (left or right, as illustrated) to cause the shift forks 96, and thereby the synchronizers 24 to move in a like manner. Thus, the actuator solenoid valves 180 must provide pressure to both sides of each shift actuator 26 to cause the shift actuators 26 to selectively move and engage the synchronizers 24 to a specific gear set. To this end, the actuator solenoid valves 180 are also multiplexed (i.e., used for more than one operation) through the use of a multiplex valve 204. The multiplex valve 204 is controlled by a multiplex solenoid valve 206. The multiplex valve 204 is illustrated in its deactivated position, but when the multiplex solenoid valve 206 applies hydraulic pressure through line 202 to activate the multiplex valve 204, the multiplex valve 204 moves to the left (as illustrated in FIG. 2) to its activated position. Through the use of the multiplex valve 204, each actuator solenoid 180 provides the hydraulic pressure for two shift movements. The actuator solenoid valves 180 and the multiplex solenoid valve 206 are electrically controlled by the transmission control assembly 88 (FIG. 3) through the application and interruption of a voltage to the coil assemblies 208 of the individual solenoids. The actuator solenoid valves 180 and the multiplex solenoid valve 206 have biasing members 210 that return them to their normally closed position when de-energized, as shown in FIG. 2.

To operate the actuator solenoid valves 180 in the example illustrated in FIG. 2, the following events must occur. When it first gear is to be engaged, there is a direct path from the actuator solenoid 186 through the multiplex valve 204 to allow actuator solenoid 186 to pressurize the left side of shift actuator 198. Then energizing actuator solenoid 198 to pressurize the left side of shift actuator 198 causes it to move the appropriate shift fork 96 and synchronizer 24 to the right (as illustrated) into first gear engagement. When engaging second gear, the multiplex solenoid valve 206 must be energized first to allow the multiplex valve 204 to move to the left to open a hydraulic path for actuator solenoid 182 to pressurize the right side of shift actuator 194 causing shift actuator 194 to move to the left so that the shifter fork 95 moves the appropriate synchronizer into second gear engagement. If the vehicle continues to accelerate, once the shift to second is completed, first gear will be disengaged and neutralized. To disengage first gear, the multiplex valve 204 is de-energized so that actuator solenoid 188 can pressurize the right side of shift actuator 198. Pressurizing the right side of shift actuator 198 will cause it to move to the left so that the shifter fork 99 moves the synchronizer out of first gear engagement to the neutral position. It should be appreciated that the disengagement of the synchronizers 24 and thus the neutralization of an engaged gear set is accomplished by actuating the opposing side of the respective shift actuator 26. This opposing, neutralizing actuation of the shift actuator 26 is only to the point of moving the shift fork 96 and respective synchronizer to the neutral and disengaged position without continuing the actuation to a full engagement of the opposing gear set. However, it should be further appreciated that this action is often required and in this particular example, due to the structure of the dual clutch transmission and hydraulic control circuit, the neutralizing action of first gear will be continued to move shift actuator 198 fully left into third gear engagement when necessary.

Therefore, in the representative example illustrated in FIG. 2, through the use of the multiplex valve 204, actuator solenoid 182 controls the shifts into either sixth or second gear, as well as the neutralization of fourth or reverse. Actuator solenoid 184 controls the shifts into fourth or reverse gear, as well as the neutralization of sixth or second. Actuator solenoid 186 controls the shifts into first gear, as well as the neutralization of third or fifth. Actuator solenoid 188 controls the shifts into third or fifth gear, as well as the neutralization of first. Since this representative example of a six-speed dual clutch transmission with reverse only requires seven shifting actions, actuator solenoid 188 only has to neutralize one gear set and actuator solenoid 186 only has to engage one gear set. It should be appreciated that the arrangement of the gear sets, the synchronizers, and the shift actuators within the dual clutch transmission may be application driven such that any relative arrangement of these components is possible as long as the even gear sets are on one axis (input shaft) and the odd gear sets are on the other axis (input shaft).

To accomplish the shift engagements, hydraulic pressure is provided to the actuator solenoid valves 180 by two actuator regulator valves 212 and 214. Actuator regulator valve 212 is controlled by actuator pressure VBS 216 and actuator regulator valve 214 is controlled by actuator pressure VBS 218. Each actuator regulator valve 212, 214 includes a valve member 220 slidingly disposed in a valve body 222. The actuator regulator valves 212 and 214 further include a bias spring 224 that causes the valve member 220 to be normally closed to the left as illustrated. The actuator pressure VBS 216, 218 supplies a variable portion of the available line pressure through the regulator control line 226 and restrictors 228 to the right side of the valve member 220 by operatively bleeding off some portion of the line pressure to the sump 90. Self-actuating return valves 230 are used in the regulator control lines 226 to act as dampers. The pressure supplied to the right side of the actuator regulator valves 212 and 214 from the actuator pressure VBS 216, 218 moves the valve members 230 to the left as illustrated. This causes the valves members 230 to open and regulate the line pressure and flow supplied to charge lines 154 of the actuator solenoids 182, 184, 186, and 188. The regulator valves 212, 214 have feed back lines 232 with restrictors 234 to assist the bias spring 224 in influencing the left side of the valve member 220.

As shown in FIG. 2, the first and second clutch mechanisms 32 and 34 of the dual, coaxial clutch assembly 12 (FIG. 1) are actuated by a clutch actuation control assembly generally indicated at 236. The clutch actuation control assembly 236 includes first and second clutch actuator solenoid valves, generally indicated at 240 and 242, respectively. The clutch actuator solenoid valves 240 and 242 are in fluid communication with, and supply hydraulic pressure to, the clutch mechanisms 32 and 34 through clutch pressure lines 244 and 246 respectively. Each of the clutch actuator solenoid valves 240 and 242 has a selectively movable valve member 248 disposed within a valve body 250 that has internal hydraulic flow passages 252 and 254. The clutch actuator solenoid valves 240 and 242 also have external hydraulic feedback passages 256, which feed both sides of the valve member 248 on differential areas. The feedback to the left side of the valve member has a restrictor 258 installed to dampen the closing bias force a predetermined amount. A solenoid 260 selectively drives the valve member 248 operatively from its de-energized position biased to the left as illustrated in FIG. 2 to its energized position which allows the flow of pressurized hydraulic fluid to flow through internal passages 254 out the clutch pressure line 244, 246 to the clutch 32,34.

The clutch actuator solenoid valves 240 and 242 are current controlled, variable regulating valves such that a given control current applied to solenoids 260 will result in a particular pressure output in the clutch pressure lines 244, 246. The internal passages 252 of clutch actuator solenoid valves 240 and 242 send residual pressure from the clutch pressure lines 244 and 246 back to the sump 90 when the solenoid is de-energized. Additionally, return valves 262 are used as dampers.

Figure 3:
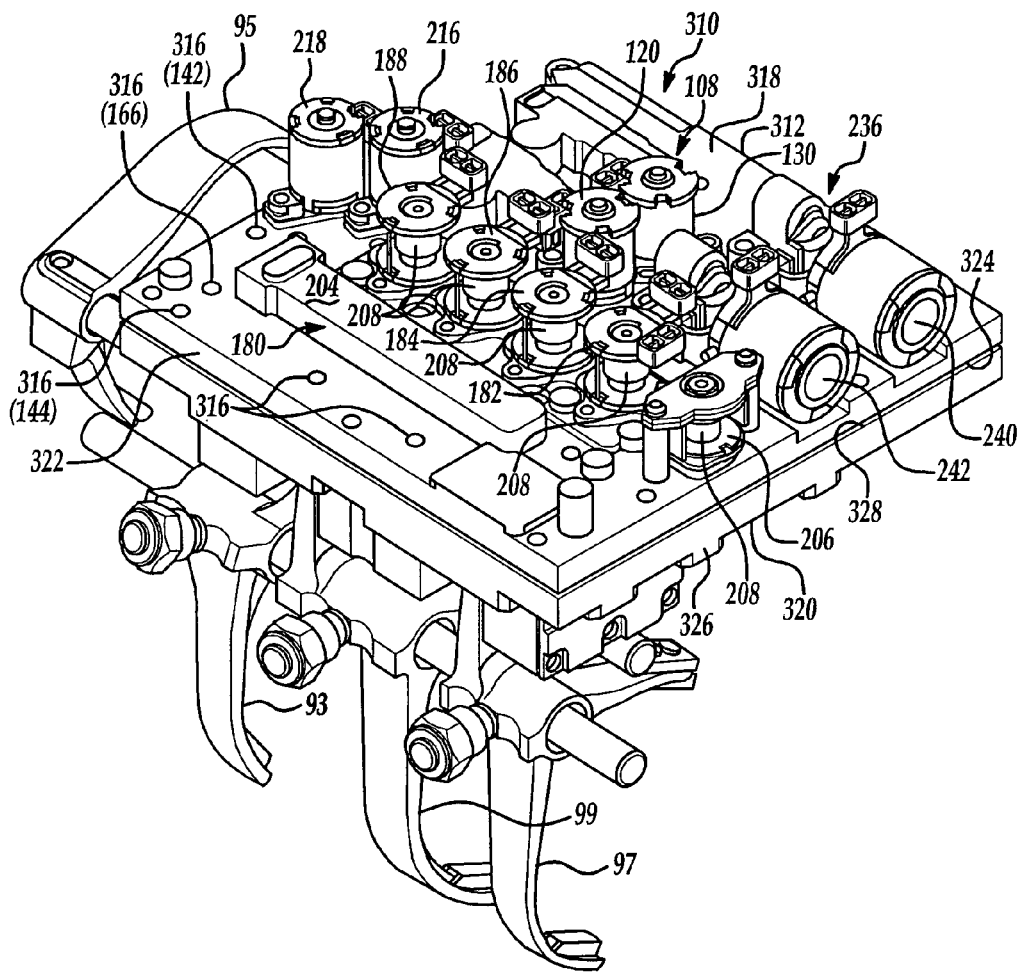
FIG. 3 is a perspective view of the module of the present invention for operatively controlling the functions of a dual clutch transmission.
Figure 4:
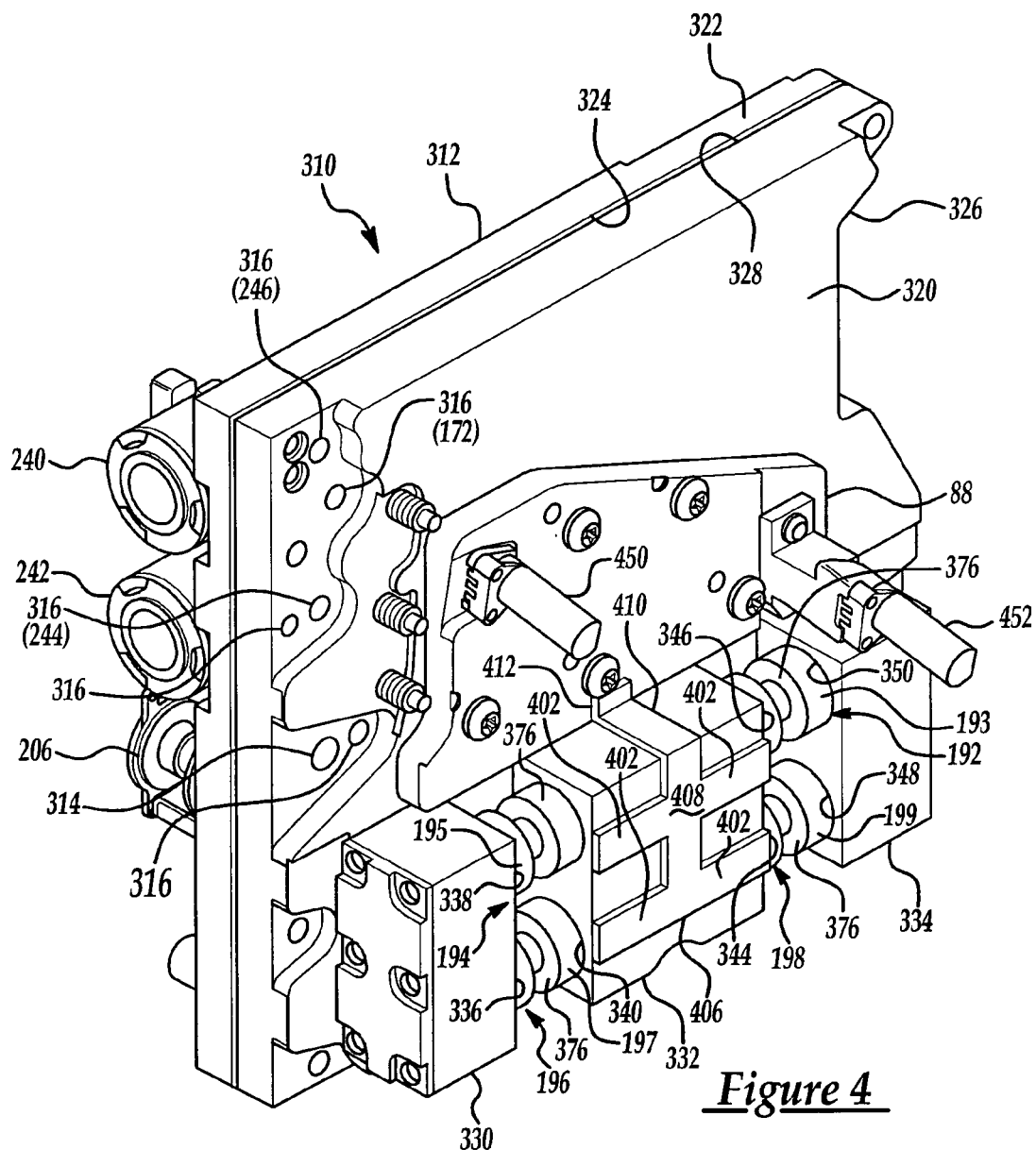
FIG. 4 is another perspective view of the module of the present invention for operatively controlling the functions of a dual clutch transmission.
Figure 5:
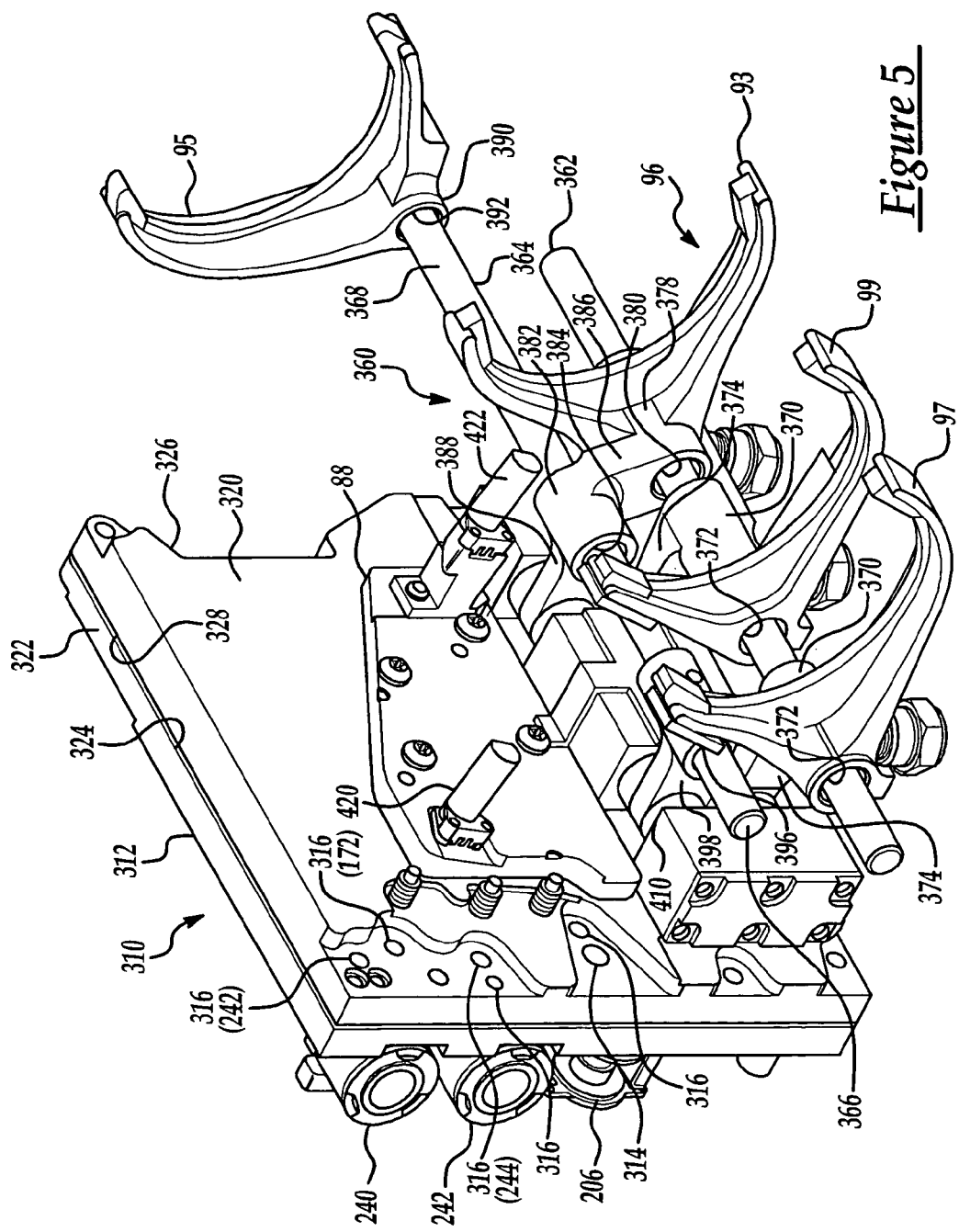
FIG. 5 is still another perspective view of the module of the present invention for operatively controlling the functions of a dual clutch transmission.

As previously discussed, to date, these various electrically actuated, hydraulically-controlled, control and support systems for the dual clutch transmission have generally been separate, individual components physically spaced from one another requiring separate hydraulic lines and fittings to provide fluid communication. As shown in FIGS. 3–5, the present invention is an integrated control module for a dual clutch transmission that incorporates the necessary electrical and electro-hydraulic control and support elements together. The module of the present invention is generally indicated at 310 in FIG. 3 where like numbers indicate like structure throughout the illustrations. The module 310 includes a valve body 312, having an inlet 314 (FIGS. 4 and 5) and a plurality of outlets 316 with a plurality of internal hydraulic passages disposed therebetween. The valve body 312 is generally rectangular in shape having a front face 318 and a rear face 320.

The inlet 314 is in fluid communication with a source of pressurized hydraulic fluid, such as the pump 94 which may be driven in some manner though a power take-off from the vehicle engine, or from an input to the transmission (not shown). More specifically, line pressure is delivered from the pump 94 (FIG. 2) and presented to the module 310 at its inlet 314 (FIGS. 4 and 5). The inlet 314 is a hydraulic continuation of the line pressure path 98 from the pump 94 through the various internal passages of the valve body 312. It should be appreciated that the pump pressure relief valve 100 (FIG. 2) may be incorporated on the valve body 312 or may simply be an inherent portion of the structure of the pump 94. In the preferred embodiment illustrated herein, the pressure relief valve 100 is incorporated in the pump 94 and the inlet 314 receives pressurized hydraulic fluid from line 98.

It should be further appreciated that the internal passages formed within the valve body 312 of the present invention create the hydraulic lines or paths discussed above in reference to FIG. 2 and eliminate the need for separate hydraulic lines and fittings between the actuators, regulators, and control solenoids of the transmission. In this regard, the plurality of outlets 316 in the valve body 312 feed only a minimum number of outgoing hydraulic lines. The plurality of outlets 316 are connected to hydraulic lines 142, 144, 166, 172, 244, and 246 as shown in FIG. 2. More specifically, these hydraulic lines run to and from the cooling unit 140 (through lines 142, 144), to various lubrication points within the transmission (through line 166), to the clutches for cooling (through line 172), and to the clutches for engagement/disengagement (through lines 244, 246).

Furthermore, the valve body 312 is constructed of any of a variety of rigid materials capable of being formed to provide internal hydraulic passages, retain treaded fasteners, and withstand the environment within the case of a dual clutch transmission. In the preferred embodiment, the valve body 312 is formed of two halves. As illustrated in FIGS. 3–5, the front half 322 includes the front face 318 and an inner surface 324, and the rear half 326 includes the rear face 320 and an inner surface 328. It should be appreciated that the terms front and rear used herein in reference to the valve body 312 are relative only for the purposes of description and not indicative of their orientation when installed in the transmission. Thus, the internal passages are of the valve body 312 are formed on the inner surfaces 324 and 328 then the halves are joined and sealed together. In should be further appreciated that the valve body 312 may also by formed of a single monolithic piece and the internal passages formed in various manners such as boring and plugging.

Further, the valve body 312 is formed on its front face 318 to accept and receive any number of the requisite hydraulic control assemblies previously discussed with respect to FIG. 2 such that the hydraulic control assemblies are inserted into portions of the internal passages of the valve body 312. More specifically, the hydraulic control assemblies are mounted to the valve body 312 such their respective valve members (discussed above) communicate with and control portions of the hydraulic flow within the internal passages of the valve body 312. In other words, a hydraulic control assembly is mounted to the valve body 312 such that the hydraulic control assembly is adapted to operatively control the pressurized hydraulic fluid from the inlet 314 through the plurality of internal hydraulic passages to the plurality of outlets 316. The hydraulic control assemblies are retained to the valve body 312 by any manner of known fastening means such as threaded fasteners (not shown).

As discussed in regard to FIG. 2, the hydraulic control assembly that may be mounted to the valve body 312 includes at least one assembly from a group of assemblies that include: 1) a shift actuation control assembly 180 having a series of actuators 26 that are adapted to actuate the synchronizers 24 of the transmission, 2) a clutch actuation control assembly 236 having clutch actuators 240, 242 for each clutch 32, 34 that are adapted to allow the selective and independent engagement and disengagement of each clutch, and 3) a clutch cooling fluid control assembly 108 adapted to control the cooling fluid provided to the clutches of the transmission. Additionally, the module 310 of the present invention may include any two of the above assemblies from the group. In the preferred embodiment, as will be discussed below; the present invention includes all three assemblies of the group.

The present invention also includes a transmission control assembly 88 that is a sealed electronic control device, which is mounted to the rear face 320 of the valve body 312 in electrical communication with the hydraulic control assembly, or assemblies, and with a higher level vehicle control system. The transmission control assembly 88 is adapted to be operatively responsive to the higher level control system to provide the requisite control signals to the hydraulic control assembly, or assemblies, to control the operative functions of the dual clutch transmission. It should be appreciated that a wiring harness is employed that electrically connects the transmission control assembly 88 with electrical connection points found on the various hydraulic control assemblies that are located on the front face 318 of the module 310 of the present invention and which additionally provides electrical communication with other parts and components of the vehicle.

In regard to the hydraulic control assemblies and referring to FIG. 3, as previously discussed the present invention includes a shift actuation control assembly 180 includes the four actuator solenoid valves 182, 184, 186, and 188 that control the four shift actuators 192, 194, 196, and 198, the multiplex valve 204, and the multiplex solenoid valve 206. The four actuator solenoid valves 182, 184, 186, and 188 that control the shift actuators 26 are mounted in the front face 322 of the front half 322 of the valve body 312 in such a manner as to selectively direct the flow of hydraulic fluid through internal hydraulic passages and the multiplex valve 204 to operatively control the shift actuators 26. The solenoid coils 208 of each of the actuator solenoid valves is selectively activated by the transmission control assembly 88 as previously discussed to cause the shift actuators 26 to engage and disengage their respective gear sets.

The two actuator regulator valves 212 and 214 that supply and regulate the hydraulic pressure to the actuator solenoid valves, as previously discussed, are mounted within the front half 322 of the valve body 312, so that they are encapsulated by the front and rear halves 322 and 326 of the valve body when assembled. The actuator pressure VBS 216 and actuator pressure VBS 218 are mounted in the front face 318 of the front half 322 of the valve body 312 in such a manner as to selectively control the actuator regulator valves 212, 214 to direct the flow of hydraulic fluid through internal hydraulic passages to the actuator solenoid valves 182, 184, 186, and 188. The self-actuating return valves 230 used for damping the regulator control lines 226 are also mounted within the front half 322 of the valve body 312.

With continued reference to FIG. 3, the multiplex valve 204 is also mounted within the front half 322 of the valve body 312 similar to the actuator regulator valves 212, 214 so that it is encapsulated by the front and rear halves 322 and 326 of the valve body when assembled. The multiplex solenoid valve 206 is mounted into the front face 322 of the front half 322 of the valve body 312 in such a manner as to selectively direct the flow of hydraulic fluid through internal hydraulic passage 202 (FIG. 2) to operate the multiplex valve 206 when its solenoid coil 208 is activated by the transmission control assembly 88.

As best shown in FIG. 4, the four shift actuators 192, 194, 196, and 198 are incorporated into the rear face 320 of the valve body 312. The valve body is formed with a left 330, a center 332, and a right 334 raised portion, as illustrated. The raised portions 330, 332, and 334 of the valve body 312 include a plurality of actuator bores that accept and slidingly retain the actuator pistons 193, 195, 197, and 199 of the shift actuators. In this manner, the raised portions, their respective piston bores, and the actuator pistons comprise the shift actuators 192, 194, 196, and 198 as previously described. More precisely, the left raised portion 330 includes actuator piston bores 336 and 338, the center raised portion 332 includes actuator piston bores 340, 342, 344, and 346, and the right raised portion 334 includes actuator piston bores 348 and 350. The shift actuator 196 (FIG. 2) includes actuator piston bore 336 of the left raised portion in combination with the actuator piston bore 340 of the center raised portion that slidingly supports actuator piston 197. The shift actuator 194 (FIG. 2) includes actuator piston bore 338 of the left raised portion in combination with the actuator piston bore 342 of the center raised portion that slidingly supports actuator piston 195. The shift actuator 198 (FIG. 2) includes actuator piston bore 344 of the center raised portion in combination with the actuator piston bore 348 of the right raised portion that slidingly supports actuator piston 199. The shift actuator 192 (FIG. 2) includes actuator piston bore 346 of the center raised portion in combination with the actuator piston bore 350 of the left raised portion that slidingly supports actuator piston 193. The actuator piston bores are in fluid communication with the multiplexer valve 204 and their respective actuator solenoid valves 182, 184, 186, and 188 as previously discussed through internal passages within the valve body 312 to cause the actuator pistons to be operatively and selectively actuated to the right or to the left as required.

As best shown in FIG. 5, when the module 310 is mounted in the transmission case, the rear face 320 of the module 310 is oriented so that it faces the transmission input and output shafts (14, 16, 18, and 20 in FIG. 1) with the shifter forks 96 extending to engage the synchronizers 24. The example of the dual clutch transmission 10 discussed above further includes a shifter fork support assembly, generally indicated at 360. The shifter fork support assembly 360 includes two shifter fork rods 362 and 364 upon which the shifter forks are disposed. When assembled, shifter rod 362 is retained in the transmission case at both its ends. Shifter rod 364 has a proximate end 366 and a distal end 368, and is slidingly supported by its proximate end 366 in the transmission case (not shown). The shifter forks for shift actuators 192, 196, and 198 are slidingly disposed on shifter rod 362. Shifter forks 97 and 99 each include a support sleeve 370 that has a central bore 372 that slidingly support the shift forks on the rod 362.

Each of the actuator pistons 193, 195, 197, and 199 discussed above has an annular groove of decreased circumference 376 at a predetermined point along their length. In the preferred embodiment, the annular groove 376 is located at the midpoint along the length of the piston and is adapted to receive and retain a connection tab from a shifter fork so that each actuator piston is in mechanical communication with a synchronizer of the transmission. More specifically, a connecting tab 374 extends from each of the support sleeves 370 to engage the annular groove 376 (FIG. 4) of the respective actuator pistons 197 and 199 to allow the actuator pistons to move the shifter forks along the support rod 362.

Shifter fork 93 includes a first support sleeve 378 with a central bore 380 that is slidingly disposed on rod 362, and a second support sleeve 382 with a central bore 384 slidingly disposed upon rod 364. A support link 386 is fixedly disposed between the first and second support sleeves 378, 382. A connecting tab 388 extends from the second support sleeve 382 to engage a reduced diameter central portion 376 (FIG. 4) of the actuator piston 193 to allow the actuator piston to move the shifter fork along the support rods 362 and 364. Shifter fork 95 has a support sleeve 390 with a central bore 392 that is fixedly mounted to the distal end 368 of support rod 364. Support rod 364 further includes an engagement sleeve 394 with a central bore 396 that is fixedly mounted to support rod 364 near its proximate end 366. A connecting tab 398 extends from the engagement sleeve 394 to engage a reduced diameter central portion 376 (FIG. 4) of the actuator piston 195. In this manner, with the engagement sleeve 390 and shifter fork 95 fixed to the support rod 364, the actuator piston 195 moves the entire support rod 364 as it is slidingly supported by the second support sleeve 382 of shifter fork 93 and the transmission case at the proximate end 366. Thus, the module 310 of the present invention controls the engagement and disengagement of the various gear sets of the transmission.

With continuing reference to FIG. 3, and as noted above, the present invention also includes a clutch actuation control assembly 236 having clutch actuators 240, 242 for each clutch 32, 34 that are adapted to allow the selective and independent engagement and disengagement of each clutch. The clutch actuators 240, 242 are mounted into the front face 322 of the front half 322 of the valve body 312 (FIG. 3) in such a manner as to control the line pressure from internal hydraulic line 98 to the individual clutches 32, 34, as described above. The self-actuating return valves 262 used for damping the output lines 244 and 246 to the clutches are mounted within the front half 322 of the valve body 312 so that they are encapsulated by the front and rear halves 322 and 326 of the valve body when assembled.

As discussed above, the present invention includes a clutch cooling fluid control assembly, generally indicated at 108 in FIG. 3 that is adapted to control the cooling fluid provided to the clutches of the transmission. The clutch cooling pressure regulator 110 and clutch cooling flow regulator 150 are mounted within the front half 322 of the valve body 312 (not shown), so that they are encapsulated by the front and rear halves 322 and 326 of the valve body when assembled. The line pressure VBS 130 is mounted into the front face 322 of the front half 322 of the valve body 312 in such a manner as to selectively and operatively set the desired cooling fluid pressure setpoint for the clutch cooling pressure regulator 110. The cooling fluid VBS 170 is mounted in the front face 322 of the front half 322 of the valve body 312 in such a manner as to control the delivery of cooling fluid to the clutches 32, 34 through the cooing fluid supply line 172 by regulating the cooling fluid flow through the clutch cooling flow regulator 150.

Those having ordinary skill in the art will appreciate from the discussion above that the choice of mounting certain components within the front half 322 of the valve body 312 is a design consideration and that these components may be alternately mounted within the rear half 324 of the valve body 312 without departing from the scope of the present invention. Additionally, some portion of these above-mentioned components may be mounted in the front half while others are mounted in the rear half. Furthermore, it is not strictly necessary that the joining of the halves provide a sealing encapsulation of these components within the module 310 if their operative control over the fluid communication within the internal hydraulic passages of the valve body 312 is otherwise formed. In other words, these components may also be physically mounted within either half 322 or 324 of the valve body 312 by any of a variety of known methods.

Figures 6, 7:
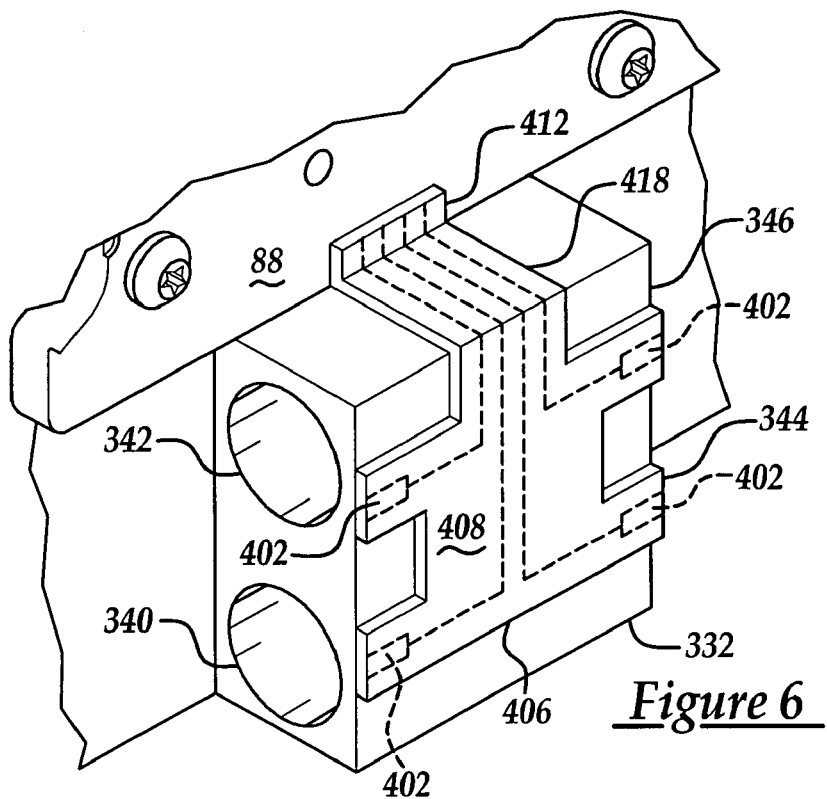
FIG. 6 is a perspective view of the central raised portion of the valve body of the present invention including the detecting elements of the integrated sensor assembly.
FIG. 7 is a perspective view of the central raised portion of the valve body of the present invention including an alternate arrangement for the detecting elements of the integrated sensor assembly.

The integrated shift actuator position sensor assembly of the integrated control module 310 is generally indicated at 400 in FIGS. 4 and 5. The components of the sensor assembly 400 are illustrated separately for clarity in FIGS. 6, 8A, and 8B. Other examples of alternate components that may be employed in the sensor assembly 400 are discussed below with reference to FIGS. 7, and 9A through 11B. The sensor assembly 400 includes a plurality of detecting elements, generally indicated at 402 in FIGS. 6 and 7, and a plurality of reference elements, generally indicated at 404 in FIGS. 8A and 8B. As shown in FIG. 6, in the preferred embodiment, the detecting elements 402 are mounted in a sensor carrier 406 that is fixedly mounted on the central raised portion 332 of the valve body 312. The sensor carrier 406 has a main portion 408 that covers the detecting elements 402 on the outer face of the central raised portion 332 and a leg 410 that extends over the side of the central raised portion 332 to the transmission control assembly 88. The appropriate wiring from the detecting elements 402 is routed through the main portion 408 and leg 410 of the sensor carrier 406 such that they are routed to a connection block 412, which provides electrical communication with the transmission control assembly 88.

The detecting elements 402 are oriented on the central raised portion 332 of the valve body 312 so that they are near the ends of the shift actuator bores 340, 342, 344, and 346. It should be appreciated that the sensor carrier 406 may be formed of any of a variety of materials and may simply cover and protect the detecting elements 402 after they are separately fixed to the valve body 312, or the detecting elements 402 may be molded into the sensor carrier 406 before it is affixed to the valve body 312. Alternately, as shown in FIG. 7, the detecting elements 402 may be affixed to the central raised portion 332 of the valve body 312 without a sensor carrier and may be electrically connected to the connection block 412 by a flat wire arrangement generally indicated at 414. The detecting elements 402 may be any manner of electro-magnetically sensitive devices, such as hall-effect sensors or magneto-resistive sensors that are capable of detecting a change in magnetic field strength. In the preferred embodiment, the detecting elements 402 are hall-effect sensors.

Figure 8A:
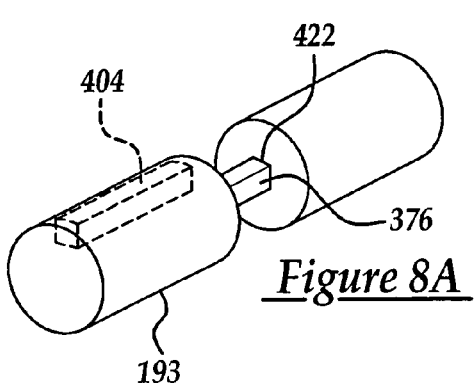
FIG. 8A is a perspective view of the one of the shift actuator pistons of the present invention including one of the reference elements of the integrated sensor assembly.

A number of examples of the corresponding reference elements 404 are illustrated in FIGS. 8A through 11B. FIGS. 8A and 8B represent the preferred embodiment, in which a single bi-polar magnetic element is mounted in a longitudinal groove 420 formed on the shift actuator piston 193. In this case, the reference elements 404 are magnetic bars mounted longitudinally within each of the pairs of actuator pistons along the length of one of the pair of actuator pistons 193. Thus, one of the plurality of detecting elements mounted on the central raised portion senses the relative position of the reference element 404, thereby the relative position of the respective pair of actuator pistons and the relative position of the respective synchronizer can be determined. Reference element 404 is formed of any of a variety of known materials capable of accepting and maintaining a bi-polar magnetic charge. As shown in FIG. 8B, reference element 404 is disposed in a groove or channel 420 that approaches but does not extend to the ends of the respective half of shift actuator piston 193. It should be appreciated that it is only necessary to place a reference element 404 in the portion of the shift actuator piston that slidingly resides in the central raised portion 332 of valve body 312. As shown, the reference element 404 presents a north and a south pole at opposite ends of the half of the actuator piston 193. This allows the respective detecting element 402 mounted on said central raised portion to sense the relative position and lateral movement of the actuator piston 193 in the piston bore 346. In this way, the relative position of the respective synchronizer 24 can be determined.

Additionally, the shaft 376 of piston 193 shown in FIG. 8A includes an flat portion 422 that cooperates with the connecting tab 388 of shifter fork 93. In this manner, as shift actuator piston 193 operatively slides back and forth in the shift actuator piston bores 346 and 350, the piston, and thereby reference element 404, is prevented from rotating in the bore and is held in a constant lateral orientation to the detecting element 402 mounted on the central raised portion 332 of the valve body 312. It should be appreciated that the structure and relative operation of each of the other shift actuator pistons 195, 197, and 199 (not shown) is the same as described with respect to shift actuator piston 193. In this manner, the other detecting elements 402 mounted to the central raised portion 332 likewise detect the movement of the their respective transmission synchronizers as well.

Figure 9A:
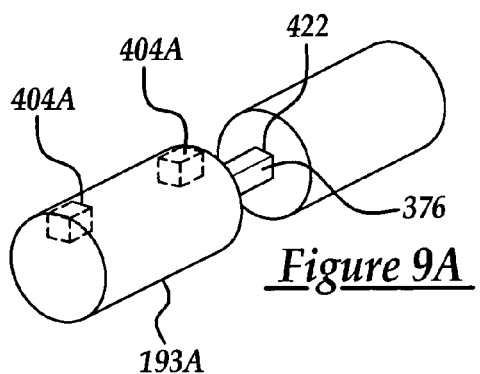
FIG. 9A is a perspective view of another embodiment of the one of the shift actuator pistons of the present invention including one pair of the reference elements of the integrated sensor assembly.
Figure 9B:
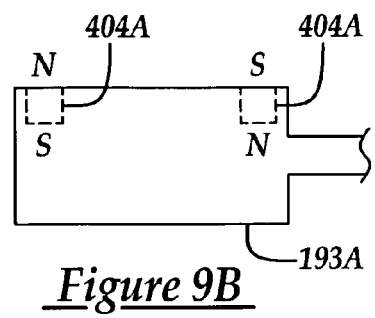
FIG. 9B is a partial cross-sectional view of the one of the shift actuator piston of FIG. 9A.

FIGS. 9A and 9B illustrate a similar approach to mounting a reference element in the piston. In this case, two separate smaller magnetic reference elements 404A are disposed at the ends of the one half of piston 193A that is slidingly disposed in actuator piston bore 346. As best shown in FIG. 9B, they are magnetic bars oriented in the actuator piston 193A in an opposite manner, such that with regard to the detecting element 402, one reference element 404A provides a north pole and the other reference element 404A provides a south pole. This allows the detecting element 402 to sense the lateral movement of the actuator piston 193A in the piston bore 346, which is directly indicative of the position the associated transmission synchronizer 24.

Figure 8B:
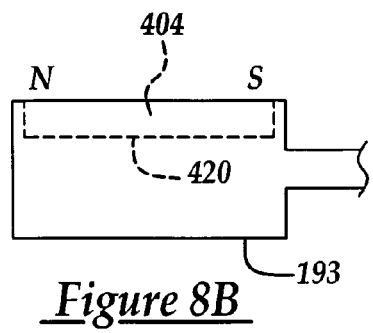
FIG. 8B is a partial cross-sectional view of the one of the shift actuator piston of FIG. 8A.

Similar to piston 193 illustrated in FIGS. 8A and 8B, the shaft 376 of piston 193A includes a flat portion so that the connecting tab 388 of the associated shifter fork will maintain a longitudinal orientation to the respective detecting element 402. It should be appreciated that the structure and relative operation of each of the other shift actuator pistons 195A, 197A, and 199A (not shown) is the same as described with respect to piston 193A. In this manner, the other detecting elements mounted to the central raised portion 332 likewise detect the movement of the their respective transmission synchronizers as well.

Figure 10A:
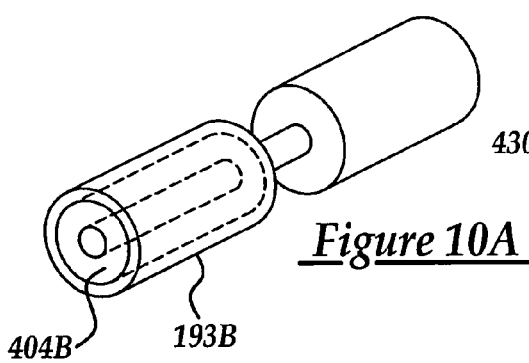
FIG. 10A is a perspective view of another embodiment of the one of the shift actuator pistons of the present invention including one of the reference elements of the integrated sensor assembly.
Figure 10B:
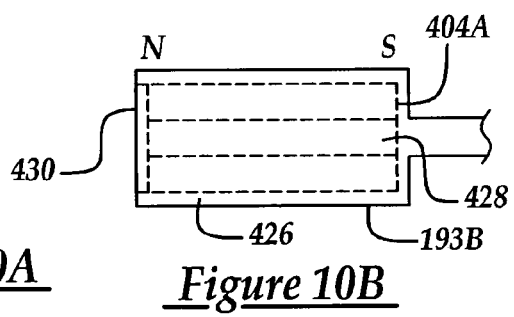
FIG. 10B is a partial cross-sectional view of the one of the shift actuator piston of FIG. 10A.

FIGS. 10A and 10B illustrate another approach to mounting a reference element in the piston 193B. As shown in the figures, the piston 193B includes a receiving bore 426 formed in one end of one of the pair of piston halves to accept a cylindrical magnetic reference element 404B. In this case, the reference element 404B has a magnetic north pole at one end of the cylindrical form and a south pole at the other. The reference element 404B may be formed with a center opening 428. Alternatively, the cylindrical magnetic reference element 404B may be formed without a center opening. If the cylindrical magnetic reference element 404B is formed having a center opening 428, it should be appreciated that the bore of the piston 193B may be formed as a fully open bore, or may be formed as a cylindrical annular groove that retains a center core, with the reference element slidingly fitted therein. Similarly, if the bore 426 of piston 193B is fully open and the cylindrical magnetic reference element 404B has a center opening 428, then the opening may be left open, filled with a separate core piece, or filled with an appropriate potting material. Regardless, when the reference element 404B is fitted into the end of the actuator piston 193B a cover plate 430 must be fitted and sealed to provide closed end that will be acted upon by the supplied hydraulic pressure to move the actuator piston 193B in the actuator bore 346.

As shown, the reference element 404B presents a north and a south pole at opposite ends of the half of the actuator piston 193B. This allows the detecting element 402 to sense the lateral movement of the actuator piston 193B in the piston bore 346, which is directly indicative of the position the associated transmission synchronizer 24. Furthermore, since the cylindrical magnetic reference element 404B disposed within actuator piston 193B provides magnetic poles fully around each end of the actuator piston half, the piston 193B does not have to be held in a particular longitudinal orientation. Thus, it is not necessary to use a flat on the shaft 376 of the piston as illustrated in regard to FIGS. 8A through 9B. It should be appreciated that the structure and relative operation of each of the other shift actuator pistons 195B, 197B, and 199B (not shown) is the same as described with respect to piston 193B. In this manner, the other detecting elements mounted to the central raised portion 332 likewise detect the movement of the their respective transmission synchronizers as well.

Figure 11A:
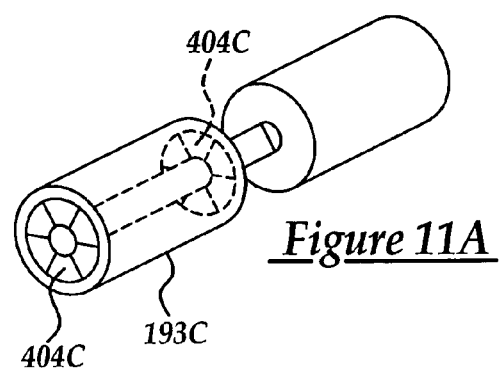
FIG. 11A is a perspective view of another embodiment of the one of the shift actuator pistons of the present invention including one of the pairs of the reference elements of the integrated sensor assembly.
Figure 11B:
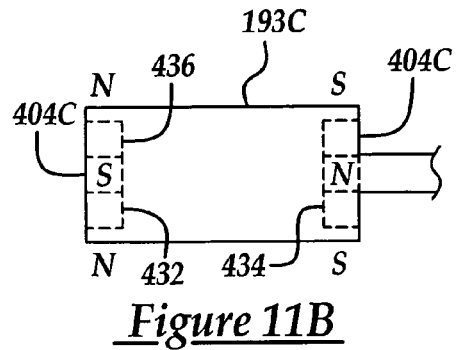
FIG. 11B is a partial cross-sectional view of the one of the shift actuator piston of FIG. 11A.

FIGS. 11A and 11B illustrate another approach to mounting a reference element in the piston 193C. As shown in the figures, a pair of annular shaped magnetic reference elements 404C are fixedly mounted in recessed annular bores 432 and 434 formed in the respective ends of one half of the actuator piston 193C. The reference elements 404C are generally ring shaped and have opposite magnetic pole configurations from their inside diameters to their outside diameters. As shown, one reference element has a north pole magnetically set on its outer diameter with a south pole magnetically set at its inner diameter. The other reference element has the opposite magnetic orientation. In this manner, the reference elements 404C present a north and a south pole at opposite ends of the half of the actuator piston 193C.

It should be appreciated that the reference elements 404C may also be formed as a series of wedge shaped magnetic pieces, or a series of generally cubed magnets (similar to reference elements 404A, in FIGS. 8A and 8B) and disposed in the recessed annular bores 432 and 434. Similar to FIGS. 10A and 10B, a cover plate 436 may be employed to seal the reference element(s) 404C to provide a closed end that will be acted upon by the supplied hydraulic pressure to move the actuator piston 193C in the actuator bore 346. It should be further appreciated that the present invention is not limited to the various embodiments shown in these illustrations in regard to the form of the detecting and reference elements. Rather, the present invention encompasses any reference element that is incorporated into the portion of the shift actuator piston that slidingly resides in the central raised portion and provides a north magnetic pole at one end and a south magnetic pole at the other for the detecting element to sense.

In addition to monitoring of the shift actuator positions, the control of the dual clutch transmission requires the monitoring the rotational speed of the two input shafts 14 and 16 (FIG. 1) during operation. Thus, the integrated control module of the present invention also includes input shaft speed sensors. In the preferred embodiment, the input shaft speed sensors are illustrated in FIGS. 4 and 5 at 450 and 452. The input shaft speed sensors 450, 452 are mounted to the transmission control assembly 88 and extend outward toward their respective input shafts when the control module 310 is installed into the transmission case.

In this way, the module 310 of the present invention provides integration of the various components necessary to provide all operative control and support of the functions of the dual clutch transmission and includes shift actuator position sensing that has its sensing elements well removed from the close proximity to, and harsh environment of the shafts and synchronizers of the conventional sensing systems. Thus, the present invention overcomes the disadvantages of the prior art by providing an integrated transmission control module that has an integrated shift actuator position sensor assembly including detecting elements 402 disposed on the central raised portion 332 of the valve body 312 that provide sensing of the movements of the shift actuator pistons and thereby allow for a determination of the transmission synchronizer movements and position. In this manner, the inefficiencies and performance losses of the prior art systems, through the use of separate and spaced hydraulic and electrical control and support components, and their requisite piping and electrical connections, are overcome by the present invention. Additionally, the integration of a combined and centralized sensor assembly provides greater cost effectiveness and efficiency in manufacturing and assembly of the dual clutch transmission.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

I claim:

1. An integrated control module for a dual clutch transmission having an integrated shift actuator position sensor assembly, said module comprising:

a valve body having an inlet in fluid communication with a source of pressurized hydraulic fluid, a plurality of outlets, and a plurality of internal hydraulic passages disposed therebetween, said valve body further having a plurality of raised portions juxtaposed to each other with a plurality of shift actuator bores piston bores formed therein;

a plurality of shift actuators that are adapted to operatively move the synchronizers of said transmission to affect gear changes, said plurality of shift actuators including a plurality of shift actuator pistons slidingly disposed within said shift actuator bores;

a hydraulic control assembly mounted to said valve body that is adapted to operatively control the pressurized hydraulic fluid from said inlet through said plurality of internal hydraulic passages to said plurality of outlets to control the operative hydraulic functions of said transmission;

a transmission control assembly mounted to said valve body in electrical communication with said hydraulic control assembly and with a higher level vehicle control system, said transmission control assembly adapted to be operatively responsive to said higher level control system to provide the requisite signals to control said hydraulic control assembly; and a sensor assembly having a plurality of detecting elements and a plurality of reference elements, at least one of said plurality of detecting elements fixedly mounted to at least one of said plurality of raised portions of said valve body and at least one of said plurality of reference elements fixedly mounted to each of said plurality of actuator pistons such that said detecting elements can sense the movement of said actuator pistons within said actuator piston bores to determine the positions of the transmission synchronizers.

2. An integrated control module as set forth in claim 1 wherein each of said plurality of shift actuators includes a pair of said actuator pistons joined together along their longitudinal axis by a shaft, each of said plurality of shift actuators further including a shifter fork having a connection tab, said shifter fork in mechanical communication with a synchronizer of said transmission and said connection tab in mechanical communication with said shaft of said pair of joined actuator pistons such that each said pair of joined actuator pistons is operable to actuate a synchronizer of said transmission.

3. An integrated control module as set forth in claim 2 wherein said plurality of raised portions further including a first and second raised portions with a third said raised portion disposed between and central to the other two.

4. An integrated control module as set forth in claim 3 wherein said sensor assembly further includes a sensor carrier upon which said plurality of detecting elements are disposed, said sensor carrier fixedly mounted to said central raised portion such that each of said plurality of detecting elements are located adjacent to one of said actuator piston bores that are formed in said central raised portion.

5. An integrated control module as set forth in claim 3 wherein said plurality of reference elements each further include a magnetic bar, one of said magnetic bars mounted longitudinally within each of said pairs of actuator pistons along the length of one of said pair of actuator pistons such that one of said plurality of detecting elements mounted on said central raised portion senses the relative position of said reference element to determine the relative position of said pair of actuator pistons and thus the relative position of the respective synchronizer.

6. An integrated control module as set forth in claim 5 wherein each of said shafts of each of said pairs of actuator pistons include a flat portion adapted to interact with said connecting tabs of said shifter forks such that each of said pairs of actuator pistons are prevented from rotating within their respective actuator piston bores so that said reference element maintains a constant linear orientation with said detecting elements.

7. An integrated control module as set forth in claim 3 wherein said plurality of reference elements each further include a pair of magnetic bars, each pair of said bars mounted within each of said pairs of actuator pistons longitudinally spaced from one another along the length of one of said pair of actuator pistons and magnetically oriented opposite to each other such that one of said plurality of detecting elements mounted on said central raised portion senses the relative position of said pair of reference elements, to determine the relative position of said pair of actuator pistons and thus the relative position of the respective synchronizer.

8. An integrated control module as set forth in claim 7 wherein each of said shafts of each of said pairs of actuator pistons include a flat portion adapted to interact with said connecting tabs of said shifter forks such that each of said pairs of actuator piston are prevented from rotating within their respective actuator piston bores so that said pairs of reference elements maintain a constant linear orientation to said detecting elements.

9. An integrated control module as set forth in claim 3 wherein each of said pair of actuator pistons includes a receiving bore formed in one end of one of said pair of actuator pistons, said plurality of reference elements each further including a magnetic cylinder that is fixedly mounted within said receiving bore of said actuator piston such that one of said plurality of detecting elements mounted on said central raised portion senses the relative position of said reference element, to determine the relative position of said pair of actuator pistons and thus the relative position of the respective synchronizer.

10. An integrated control module as set forth in claim 3 wherein said plurality of reference elements each further include a pair of magnetic annular rings, one ring of said pair of annular rings mounted in one end of one of said pair of actuator pistons and the other of said pair of annular rings mounted in the opposite end of the same one of said pair of actuator pistons so that said pair of annular rings are longitudinally spaced from one another and magnetically oriented opposite to each other such that one of said plurality of detecting elements mounted on said central raised portion senses the relative position of said pair of reference elements, to determine the relative position of said pair of actuator pistons and thus the relative position of the respective synchronizer.

11. An integrated control module as set forth in claim 10 wherein each of said pair of reference elements are further defined as a plurality of wedge-shaped magnetic segments that jointly form an annular ring.

12. An integrated control module as set forth in claim 10 wherein each of said pair of reference elements each further include a plurality of rectangular magnetic segments that magnetically form an annular ring.

13. An integrated control module for a dual clutch transmission having an integrated shift actuator position sensor assembly, said module comprising:

a valve body having an inlet in fluid communication with a source of pressurized hydraulic fluid, a plurality of outlets, and a plurality of internal hydraulic passages disposed therebetween, said valve body further having a plurality of raised portions juxtaposed to each other with a plurality of shift actuator bores piston bores formed therein;

a plurality of shift actuators that are adapted to operatively move the synchronizers of said transmission to affect gear changes, said plurality of shift actuators including a plurality of shift actuator pistons slidingly disposed within said shift actuator bores;

a hydraulic control assembly mounted to said valve body such that said hydraulic control assembly is adapted to operatively control the pressurized hydraulic fluid from said inlet through said plurality of internal hydraulic passages to said plurality of outlets, said hydraulic control assembly including at least one assembly from a group including a shift actuation control assembly adapted to actuate said shift actuators, a clutch actuation control assembly adapted to allow the selective and independent engagement and disengagement of each clutch, and a clutch cooling fluid control assembly adapted to control the cooling fluid provided to the clutches;

a transmission control assembly mounted to said valve body in electrical communication with said hydraulic control assembly and with a higher level vehicle control system, said transmission control assembly adapted to be operatively responsive to said higher level control system to provide the requisite control signals to said hydraulic control assembly to control the operative functions of said transmission; and a sensor assembly having a plurality of detecting elements and a plurality of reference elements, at least one of said plurality of detecting elements fixedly mounted to at least one of said plurality of raised portions of said valve body and at least one of said plurality of reference elements fixedly mounted to each of said plurality of actuator pistons such that said detecting elements can sense the movement of said actuator pistons within said actuator pistons bores.

14. An integrated control module as set forth in claim 13 wherein each of said plurality of shift actuators includes a pair of said actuator pistons joined together along their longitudinal axis by a shaft, each of said plurality of shift actuators further including a shifter fork having a connection tab, said shifter fork in mechanical communication with a synchronizer of said transmission and said connection tab in mechanical communication with said shaft of said pair of joined actuator pistons such that each said pair of joined actuator pistons is operable to actuate a synchronizer of said transmission.

15. An integrated control module as set forth in claim 14 wherein said plurality of raised portions further including a first and second raised portions with a third said raised portion disposed between and central to the other two.

16. An integrated control module as set forth in claim 15 wherein said sensor assembly further includes a sensor carrier upon which said plurality of detecting elements are disposed, said sensor carrier fixedly mounted to said central raised portion such that each of said plurality of detecting elements are located adjacent to one of said actuator piston bores that are formed in said central raised portion.

17. An integrated control module as set forth in claim 15 wherein said plurality of reference elements each further include a magnetic bar, one of said magnetic bars mounted longitudinally within each of said pairs of actuator pistons along the length of one of said pair of actuator pistons such that one of said plurality of detecting elements mounted on said central raised portion senses the relative position of said reference element to determine the relative position of said pair of actuator pistons and thus the relative position of the respective synchronizer.

18. An integrated control module as set forth in claim 17 wherein each of said shafts of each of said pairs of actuator pistons include a flat portion adapted to interact with said connecting tabs of said shifter forks such that each of said pairs of actuator piston are prevented from rotating within their respective actuator piston bores so that said reference elements maintain a constant linear orientation with said detecting elements.

19. An integrated control module as set forth in claim 15 wherein said plurality of reference elements each further include a pair of magnetic bars, each pair of said bars mounted within each of said pairs of actuator pistons longitudinally spaced from one another along the length of one of said pair of actuator pistons and magnetically oriented opposite to each other such that one of said plurality of detecting elements mounted on said central raised portion senses the relative position of said pair of reference elements, to determine the relative position of said pair of actuator pistons and thus the relative position of the respective synchronizer.

20. An integrated control module as set forth in claim 18 wherein each of said shafts of each of said pairs of actuator pistons include a flat portion adapted to interact with said connecting tabs of said shifter forks such that each of said pairs of actuator piston are prevented from rotating within their respective actuator piston bores so that said pairs of reference elements maintain a constant linear orientation to said detecting elements.

* * * * *